United States Patent
Noguchi et al.

(10) Patent No.: US 9,360,068 B2
(45) Date of Patent: Jun. 7, 2016

(54) DISK BRAKE

(75) Inventors: Shoichi Noguchi, Suzhou (CN);
Daisuke Tanabe, Yamanashi (JP);
Takeshi Fujiki, Yamanashi (JP); Koichi Masuko, Yamanashi (JP); Shigeru Hayashi, Yamanashi (JP); Koji Fukui, Tokyo (JP); Yoichi Kumemura, Kanagawa (JP); Hayuru Inoue, Kanagawa (JP); Seiko Tsubota, Kanagawa (JP)

(73) Assignee: Hitachi Automotive Systems, Ltd. (JP)

( * ) Notice: Subject to any disclaimer, the term of this patent is extended or adjusted under 35 U.S.C. 154(b) by 217 days.

(21) Appl. No.: 12/801,847

(22) Filed: Jun. 29, 2010

(65) Prior Publication Data

US 2010/0326777 A1 Dec. 30, 2010

(30) Foreign Application Priority Data

Jun. 30, 2009 (JP) ................ 2009-155476

(51) Int. Cl.
*F16D 65/40* (2006.01)
*F16D 65/097* (2006.01)
*F16D 66/02* (2006.01)

(52) U.S. Cl.
CPC ........ *F16D 65/0978* (2013.01); *F16D 65/0972* (2013.01); *F16D 66/02* (2013.01)

(58) Field of Classification Search
CPC ............. F16D 65/097; F16D 65/0972; F16D 65/0977; F16D 65/0978
USPC .......... 188/73.35, 73.36, 73.37, 73.38, 73.39
See application file for complete search history.

(56) References Cited

U.S. PATENT DOCUMENTS

| 4,408,681 | A  | * | 10/1983 | Oshima ................... 188/73.38 |
| 4,460,067 | A  | * | 7/1984  | Katagiri et al. ........ 188/1.11 W |
| 4,512,446 | A  | * | 4/1985  | Chuwman et al. ....... 188/73.38 |
| 7,219,773 | B2 | * | 5/2007  | Ono ........................ 188/73.38 |
| 7,578,374 | B2 | * | 8/2009  | Takeo et al. ............. 188/73.38 |
| 2008/0135353 | A1 | * | 6/2008 | Takeo et al. ............. 188/73.39 |

FOREIGN PATENT DOCUMENTS

| JP | 10-331883  | A |   | 12/1998 |               |
| JP | 10331883   | A | * | 12/1998 | ... F16D 65/097 |

OTHER PUBLICATIONS

Machine Translation of JP 10331883.*
Machine Translation of JP 10-331883 (no date).*

* cited by examiner

*Primary Examiner* — Nicholas J Lane
(74) *Attorney, Agent, or Firm* — Fishman Stewart PLLC

(57) ABSTRACT

A disc brake that suppresses braking noises when a vehicle moves backward include an urging spring urging a friction pad toward a rotationally exiting side of a disc when the vehicle moves forward, the urging spring being arranged between a hook portion of the friction pad and a torque receiving portion of a carrier. The urging spring formed through bend of an elastic plate material has its spring constant that is set to be a small value to avoid resonance frequency causing noise where the base end side thereof is fixed to the hook portion of the backing plate while the top end side thereof elastically abuts to the torque receiving portion of the carrier. The urging spring is located at the position that is outside in the radial direction from the center position of the hook portion in its width direction.

19 Claims, 12 Drawing Sheets

US 9,360,068 B2

DISK BRAKE

BACKGROUND OF THE INVENTION

1. Field of the Invention

The present invention relates to a disk brake, which applies braking force to a vehicle such as an automobile.

2. Description of the Related Art

In general, a disk brake mounted on a vehicle such as an automobile is configured to include: a mounting member which is mounted to non-rotating parts of the vehicle; a pair of friction pads that is supported by the mounting member so as to be pressed to both faces of a disk with fluid pressure supplied to a caliper; an urging spring (so-called anti-rattle spring) which is arranged between the friction pad and the mounting member so as to urge the friction pad toward an exit side of a disk rotational direction (circumferential direction), and the like. See Japanese Patent Application Laid-Open No. 10-331883 (hereinafter referred to as the "Patent Document 1").

SUMMARY OF THE INVENTION

Here, with a disk brake having an urging spring which is adopted in the above related art, there has been a problem as that braking noise tends to occur until friction pads abut to a torque receiver of a mounting member while a vehicle moves backward, for example.

The present invention has been made in view of the above problem based on the Patent Document 1, and an object of the present invention is to provide a disk brake capable of suppressing braking noise occurrence when vehicle moves backward direction.

In order to solve the above problem, a disk brake according to the present invention comprises: a mounting member fixed to a vehicle by extending over a disk; a friction pad including a lining made of friction material and a backing plate supported by the mounting member, the backing plate having a pair of lateral portions at both thereof in a disk circumferential direction, the pair of lateral portions having a portion for transmitting torque at braking to the mounting member; a caliper arranged slidably to the mounting member so as to press the friction pad to the disk; and an urging means including an extending portion urging the friction pad toward a disk rotationally exiting side, the extending portion being arranged between one lateral portion of the pair of lateral portions as a disk rotationally entering side at the time of vehicle forward movement and an opposed surface portion of the mounting member opposed to the one lateral portion, the extending portion also elastically contacting to either the one lateral portion or the opposed surface portion, wherein the urging means has smaller spring constant than spring constant k defined by Formula k=4 pi$^2$×f$^2$×m where f is an eigenfrequency defined upon the caliper vibrating as a rigid body in a condition that the caliper is mounted to the mounting member and m is a mass of the friction pad.

Further, a disk brake according to a second aspect of the present invention comprises: a mounting member fixed to a vehicle by extending over a disk and having a pair of torque receiving portions receiving torque generated by braking, the mounting member being also slidably provided with a caliper pressing at least a pair of friction pads facing toward both sides of the disk against the disk; and an urging means urging at least one friction pad of the pair of friction pads toward a disk rotationally exiting side, wherein the friction pad is supported with the mounting member at both sides thereof in a disk circumferential direction, and the friction pad having a pair of torque transmitting portions being abutted to each of the pair of torque receiving portions, the urging means including an extending portion arranged between one torque transmitting portion of the pair of torque transmitting portions as a disk rotationally entering side at the time of vehicle forward movement and an opposed surface of the mounting member that faces the one torque transmitting portion, the extending portion elastically abutting to either the one torque transmitting portion or the opposed surface, and the extending portion keeps a cantilevered state until the one torque transmitting portion abuts to one torque receiving portion of the pair of torque receiving portions as to face the one torque transmitting portion upon the backward vehicle movement.

Still further, a disk brake according to a third aspect of the present invention comprises: a mounting member fixed to a vehicle by extending over a disk, the mounting member having a pair of torque receiving portions receiving torque generated by braking, a caliper slidably provided with the mounting member so as to press at least a pair of friction pads facing toward both sides of the disk against the disk, and an urging means urging the friction pads toward a disk rotationally exiting side, wherein each of the friction pads include a backing plate that is supported with the mounting member at both sides thereof in a disk circumferential direction, the backing plate being provided with a pair of torque transmitting portion being abutted to each of the pair of torque receiving portion, and the backing plate also having a friction material that is fixed on one surface side thereof so as to generate friction force through abutment of the friction material against the disk, and the urging means including: a mounting portion fixed to one surface side of the backing plate at disposing the friction material; a first extending portion connected to the mounting portion at a base end side thereof, the first extending portion extending in a direction away from the disk so as to direct toward the other surface side opposing to the one surface side of the backing plate; a folded portion arranged at a top end side of the first extending portion, the folded portion being folded to be arc-shaped in a direction approaching to the disk on the other surface side of the backing plate; and a second extending portion extended in a direction approaching from the top end side of the folded portion toward the disk, the second extending portion contacting to the mounting member side in an elastic deformation state As described above, according to the present invention, it is possible to suppress noise occurrence such as braking noise at the time of braking vehicles in a backward moving direction.

DETAILED DESCRIPTION OF THE PREFERRED EMBODIMENTS

Figure 1:
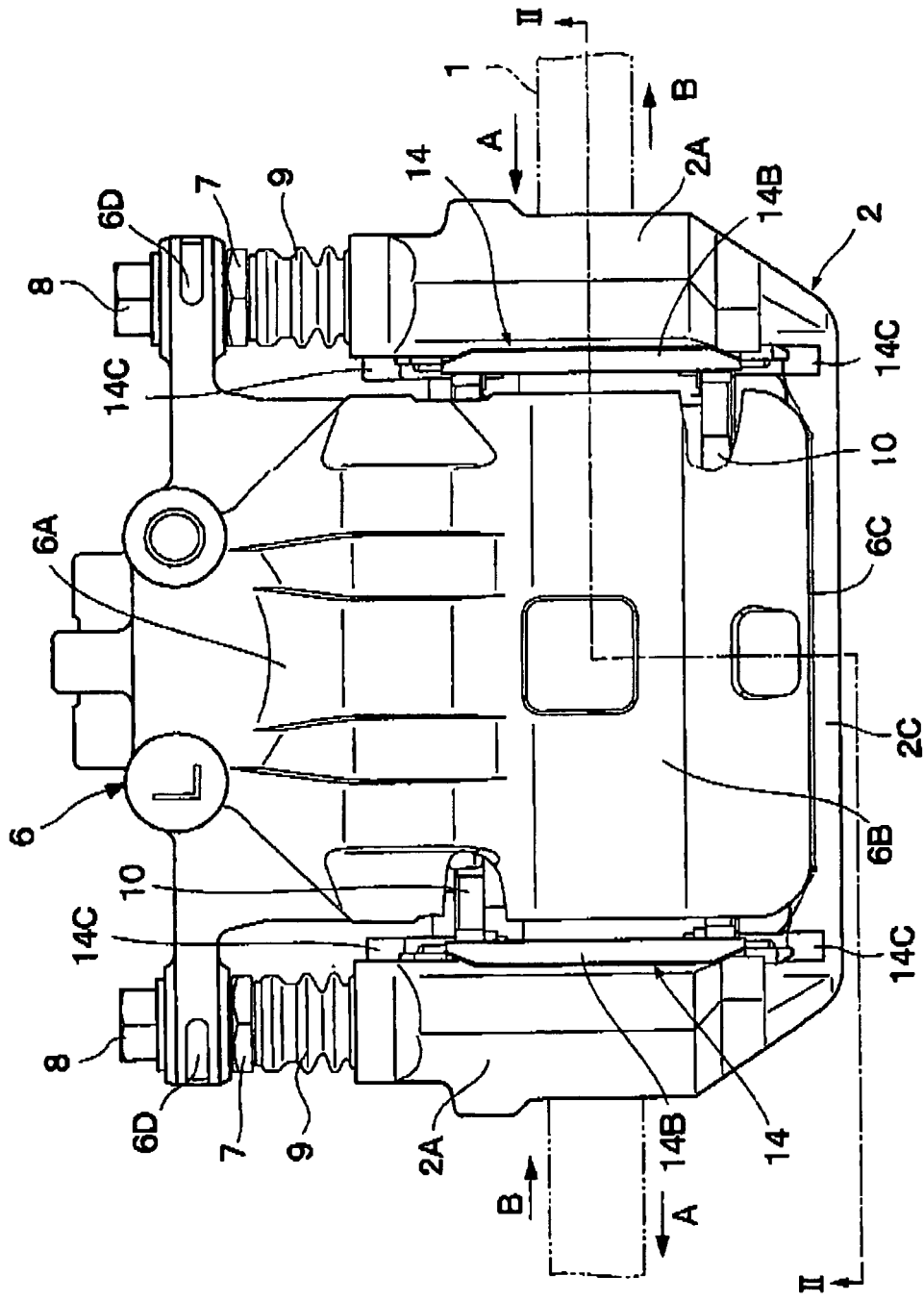
FIG. 1 is a plane view of a disk brake according to a first embodiment of the present invention viewing from the upper side.

Hereinafter, disk brakes according to embodiments of the present invention will be described in detail with reference to the attached drawings.

Here, FIGS. 1 to 11 illustrate the first embodiment of the present invention. A rotating disk 1 is illustrated in the drawings. For example, the disk 1 is rotated along with a wheel (not illustrated) in the direction of arrow A in FIG. 1 when a vehicle moves forward, and is rotated in the direction of arrow B when the vehicle moves backward.

Figure 2:
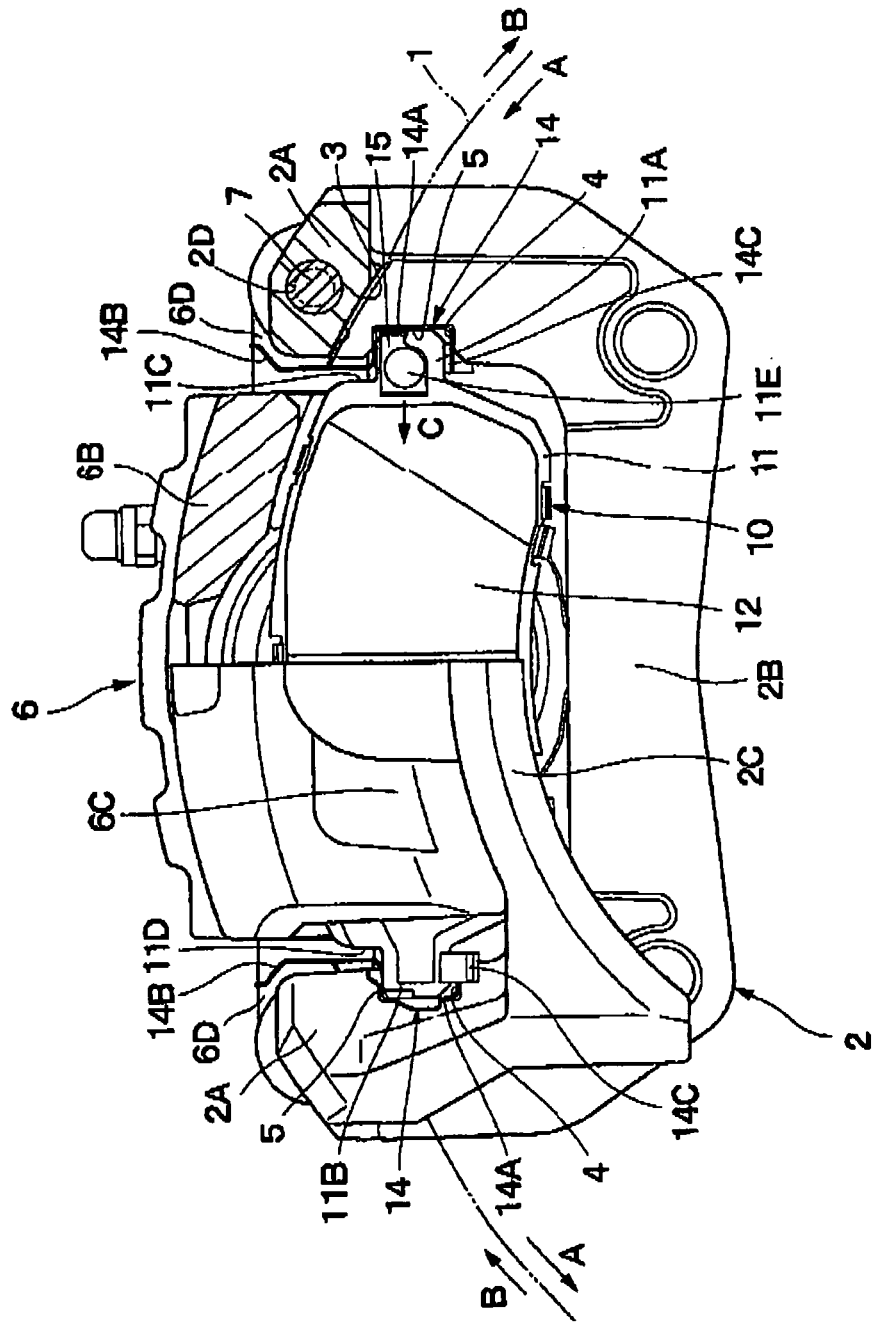
FIG. 2 is a partially sectioned front view of the disk brake viewing from the direction of arrows II-II in FIG. 1.
Figure 3:
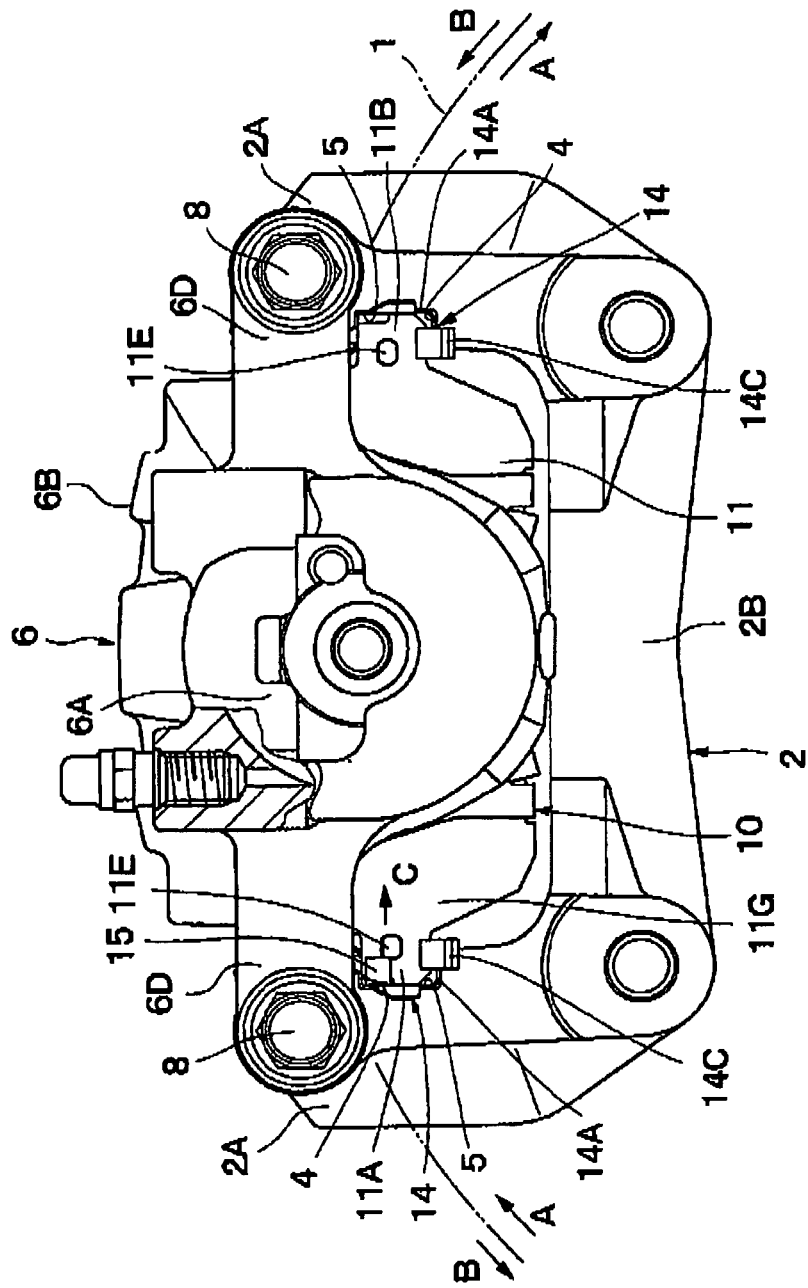
FIG. 3 is a rear view of the disk brake illustrated in FIG. 2.

A carrier 2 is a mounting member to be mounted to a non-rotating portion of the vehicle. As illustrated in FIGS. 1 to 3, the carrier 2 is constituted with a pair of arm portions 2A, 2A being apart in the rotational direction (circumferential direction) of the disk 1 and extending in the axial direction of the disk 1 so as to extend over the circumference of the disk 1, a thick support portion 2B arranged to integrally connect the base end sides of the respective arm portions 2A, 2A and fixed to the non-rotating portion of the vehicle at a position that is placed at the inner side of the disk 1, and the like.

Further, as illustrated in FIG. 2, the carrier 2 is integrally formed with a reinforcing beam 2C to mutually connect the top end sides of the arm portions 2A, 2A, the reinforcing beam 2C being arch-shaped at a position that is placed at the outer side of the disk 1. With these configurations, the respective arm portions 2A, 2A of the carrier 2 are integrally connected by the reinforcing beam 2C at the outer side while being integrally connected by the support portion 2B at the inner side of the disk 1.

Figure 6:
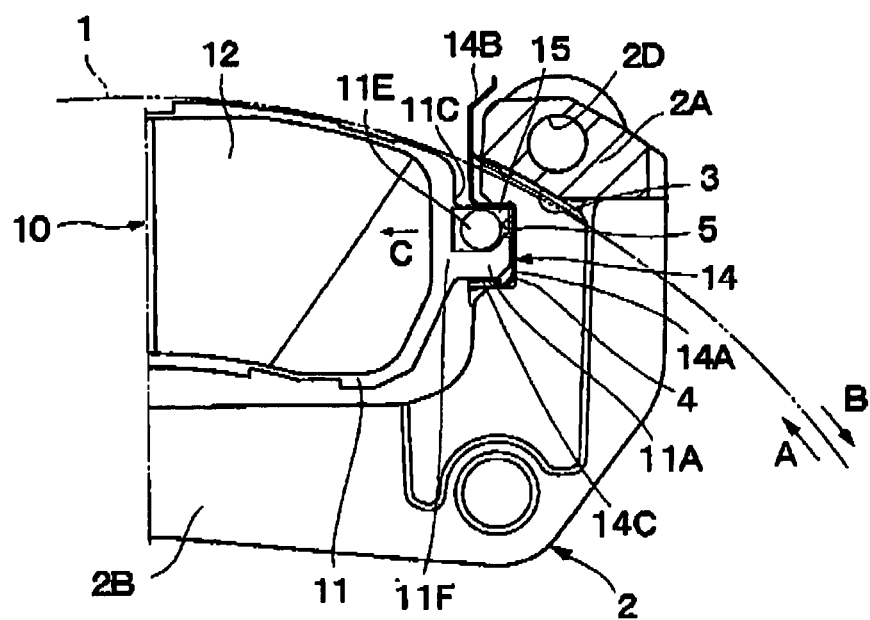
FIG. 6 is a sectional view of the mounting member, the friction pad, the pad spring, the urging spring and the like in FIG. 4 viewing from the direction of arrows VI-VI in FIG. 4.

Further, as illustrated in FIGS. 2 and 6, a disk pass portion 3 extending to be arc-shaped along the circumference (rotational locus) of the disk 1 is formed at the intermediate part of the arm portion 2A in the axial direction of the disk 1. Pad guides 4, 4 on the inner side and the outer side are formed respectively at both sides of the disk pass portion 3 in the axial direction of the disk 1. Further, as illustrated in FIGS. 2 and 6, a pin hole 2D is formed at each of the arm portions 2A, 2A. A later-mentioned slide pin 7 is slidably inserted respectively into the pin hole 2D.

As illustrated in FIGS. 2 to 6, the pad guide 4 is formed as a concave groove to be U-shaped in section. A later-mentioned friction pad 10 extends in the axial direction of the disk 1, that is, in the direction where the friction pad 10 is displaced in a sliding manner.

Hook portions 11A, 11B of the friction pad 10 are respectively fitted to the pad guide 4 in a concavoconvex manner being sandwiched in the vertical direction (disk radial direction). The friction pad 10 is guided in the disk axial direction via the hook portions 11A, 11B. A torque receiving portion 5 is formed at a wall face of the back side of the pad guide 4. The torque receiving portion 5 receives braking torque occurring at braking operation via the hook portion 11A, 11B of the friction pad 10.

That is, the pad guide 4 of the left side located at the exit side in the rotational direction of the disk 1 rotating in the direction of arrow A (hereinafter, called the rotationally exiting side) out of the bilateral pad guides 4, 4 of FIG. 2, in particular, the torque receiving portion 5 at the bottom portion side, receives the braking torque received by the friction pad 10 from the disk 1 at the time of braking operation via the hook portion 11B of a backing plate 11 and a guide plate portion 14A of a later-mentioned pad spring 14. On the other hand, the bottom portion side of the pad guide 4 located at the rotationally entering side of the disk 1 rotated in the direction of arrow A (hereinafter, called the rotationally entering side), that is, the torque receiving portion 5, is in a state of being slightly apart from the hook portion 11A of the friction pad 10 at the time of braking operation.

A caliper 6 is arranged slidably to the carrier 2. As illustrated in FIG. 1, the caliper 6 is constituted with an inner leg portion 6A arranged at the inner side being one side of the disk 1, a bridge portion 6B extending from the inner leg portion 6A to the outer side being the other side of the disk 1 so as to extend over the circumferential side of the disk 1 between the arm portions 2A, 2A of the carrier 2, and an outer leg portion 6C extending from the outer side being the top end side of the bridge portion 6B to a radially inward direction of the disk 1 and having the top end side thereof bifurcated.

Further, a cylinder (not illustrated) in which, a piston (not illustrated) is slidably inserted, is formed at the inner leg portion 6A of the caliper 6. Still further, a pair of mounting portions 6D, 6D projecting laterally in FIGS. 1 and 3 is arranged at the inner leg portion 6A. Each of the mounting portions 6D slidably supports the entire caliper 6 to each arm portion 2A of the carrier 2 via the later-mentioned slide pin 7.

As illustrated in FIG. 1, the slide pin 7 is each fastened to the mounting portion 6D of the caliper 6 with a bolt 8. The top end side of each of the slide pins 7 extends toward the pin hole 2D of each of the arm portions 2A of the carrier 2 and slidably inserted into each of the pin holes 2D of the carrier 2 as exemplified in FIG. 2.

Protection boots 9, 9 are mounted respectively between each of the arm portions 2A and each of the slide pins 7. Accordingly, rainwater and the like are prevented from entering between the slide pin 7 and the pin hole 2D of the arm portion 2A.

The friction pads 10 are arranged to oppose respectively to both faces of the disk 1. As illustrated in FIGS. 1 to 6, the friction pad 10 is constituted with the plate-shaped backing plate 11 extending to be approximately flabellate in the circumferential direction (rotational direction) of the disk 1, a lining 12 (see FIGS. 10 and 11) as friction material arranged to be fixed at the front face side of the backing plate 11 and frictionally contacted to a surface of the disk 1, and the like.

The hook portions 11A, 11B formed to be convex are arranged at the backing plate 11 of the friction pad 10 as a fitting portion at the side face parts positioning at both sides of the backing plate 11 in the disk circumferential direction. The hook portions 11A, 11B of the backing plate 11 respectively constitute a torque transmitting portion to transmit the braking torque received by the friction pad 10 from the disk 1 at the time of braking operation of the vehicle through contact with the torque receiving portion 5 of the carrier 2.

As illustrated in FIGS. 2 and 3, for example, the hook portions 11A, 11B of the friction pad 10 (backing plate 11) are formed to be symmetric and to be mutually the same shape. Then, one hook portion 11A is arranged at the rotationally entering side of the disk 1 rotated in the direction of arrow A (rotationally entering side) when vehicle moves forward. The other hook portion 11B is arranged at the exiting side in the rotational direction of the disk 1 (rotationally exiting side).

A later-mentioned urging spring 15 is arranged at the hook portion 11A located at the rotationally entering side of the disk 1 out of the bilateral hook portions 11A, 11B being the torque transmitting portions of the friction pad 10.

Flat face portions 11C, 11D are formed at the backing plate 11 of the friction pad 10 at both sides in the length direction thereof, that is, at the side face parts positioning at the rotationally entering side and the rotationally exiting side of the disk 1. The flat face portions 11C, 11D extend outward in the radial direction of the disk 1 being perpendicular to the projecting direction of the hook portions 11A, 11B.

Figure 10:
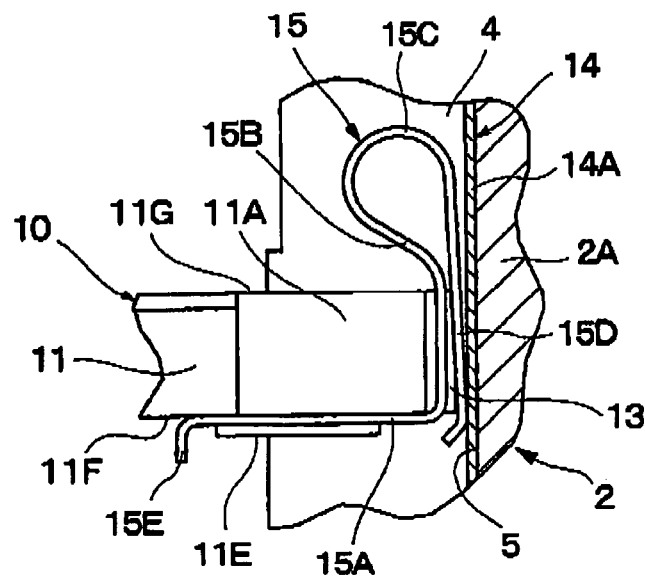
FIG. 10 is a sectional view at the similar position to that of FIG. 9 illustrating a deformed state of the urging spring at the time of braking in the vehicle backward moving direction.
Figure 11:
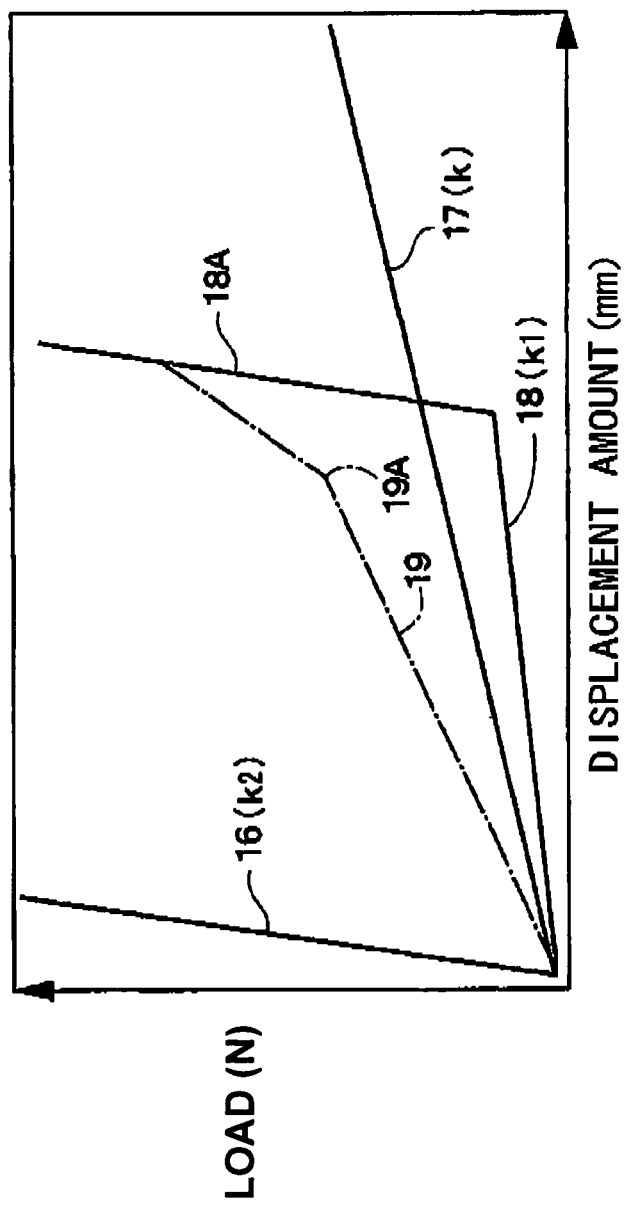
FIG. 11 is a characteristic diagram which indicates spring characteristics of the urging spring.

Caulking portions 11E, 11E are arranged at the backing plate 11 of the friction pad 10 being located toward the base end side (root side) of the hook portions 11A, 11B. As illustrated in FIGS. 10 and 11, the caulking portion 11E is arranged so as to project to one face (hereinafter, called the front face 11F) side of the backing plate 11 to which the lining 12 is disposed. Caulking is performed on the caulking portion 11E located at the rotationally entering side of the disk 1 out of the respective caulking portions 11E in order to fix the later-mentioned urging spring 15 to the backing plate 11 of the friction pad 10.

Figure 7:
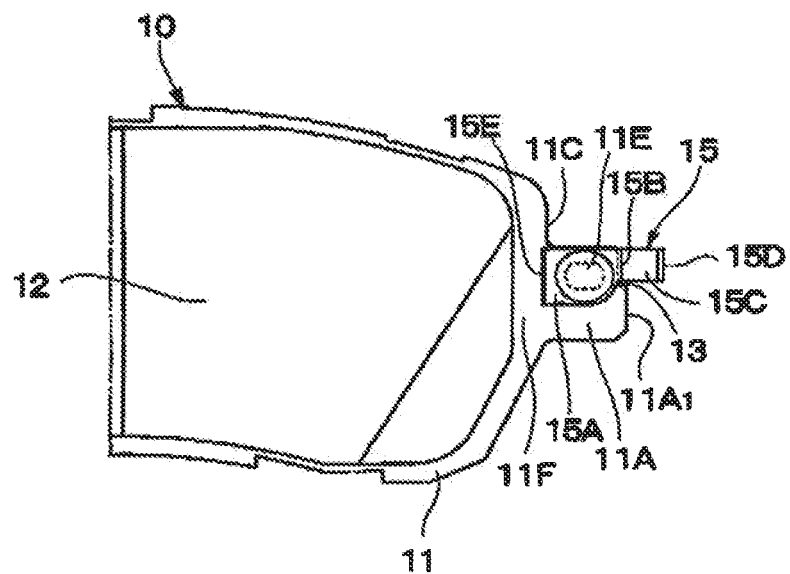
FIG. 7 is a front view which illustrates a state that the urging spring is mounted to the friction pad in FIG. 6.

A concave groove 13 is arranged at the hook portion 11A of the backing plate 11. As illustrated in FIGS. 7 to 12, the concave groove 13 is formed by partially cutting out the end face 11A1 of the top end side (projecting side) of the hook portion 11A to be L-shaped so as to constitute an accommodation groove to accommodate a part of the later-mentioned urging spring 15. Then, as illustrated in FIG. 7, the groove depth h of the concave groove 13 against the end face 11A1 of the hook portion 11A is set to a dimension being approximately twice of the plate thickness t of the later-mentioned urging spring 15 ($h \approx 2 \times t$).

Figure 12:
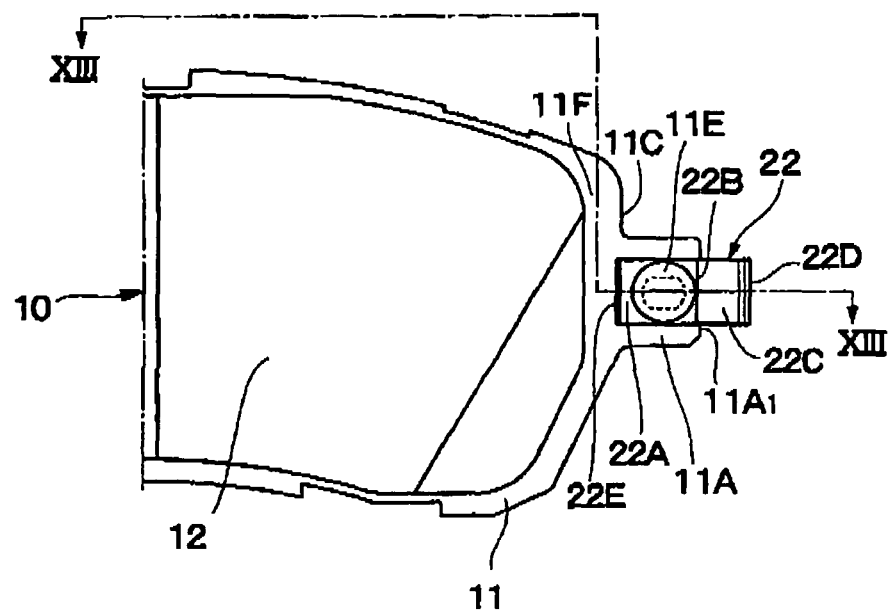
FIG. 12 is a front view which illustrates a state that the urging spring according to a second embodiment is mounted to the friction pad.

As also illustrated in FIGS. 10 and 12, the concave groove 13 is arranged at a position placed externally in the radial direction from the center position of the hook portion 11A in the width direction (disk radial direction). Here, it is preferable to configure to form the concave groove 13 as well at the hook side 11B located at the rotationally exiting side of the disk 1 as similar to the hook portion 11A of the rotationally entering side. With this configuration, commonality of parts of the friction pads 10 can be achieved between the inner side and the outer side of the disk 1. Accordingly, it becomes possible to reduce parts of the disk brake and to ease manufacturing complexity.

Pad springs 14, 14 are mounted respectively to the arm portions 2A of the carrier 2. The pad springs 14, 14 elastically support the respective friction pads 10, 10 of the inner side and the outer side and smoothen the sliding displacement of the friction pads 10, 10. The pad spring 14 is formed by performing bending (press molding) on a stainless steel plate and the like having elasticity, as illustrated in FIGS. 1 to 6.

The pad spring 14 is configured to include a pair of guide plate portions 14A, a connection plate portion 14B and a radially urging plate portion 14C. The pair of guide plate portions 14A are formed by being folded to be approximately U-shaped to be fitted into each of the pad guides 4 of the carrier 2 being apart mutually between the inner side and the outer side of the disk 1. The connection plate portion 14B is formed to extend in the axial direction in a state of extending over the circumference side of the disk 1 so as to integrally connect the respective guide plate portions 14A of the inner side and the outer side of the disk 1. The radially urging plate portions 14C, 14C are respectively formed integrally with each of the guide plate portions 14A at the inner part in the radial direction of the disk 1.

Figure 16:
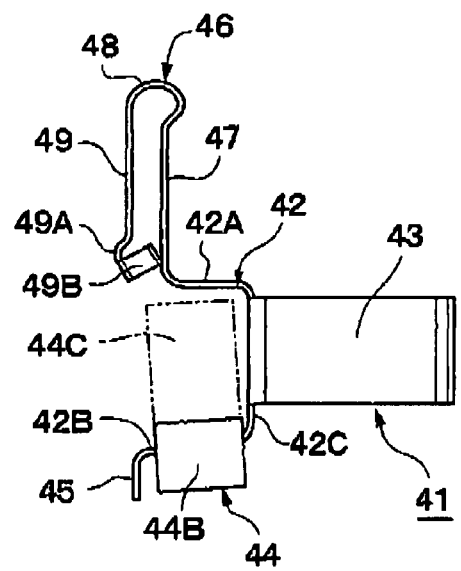
FIG. 16 is a front view which illustrates the pad spring of FIG. 15 by enlarging as a single part.
Figure 17:
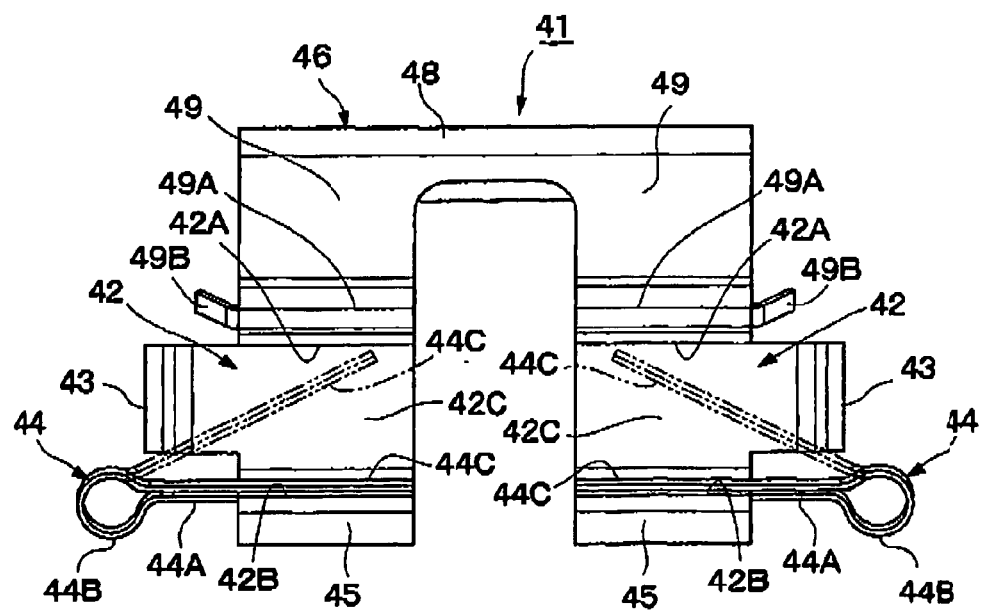
FIG. 17 is a left side view of the pad spring of FIG. 16 viewing from the left side.

As illustrated in FIGS. 2, 3, 5 and 6, each of the guide plate portions 14A of the pad spring 14 is mounted to be fitted into each of the pad guides 4 of the carrier 2 and has a function to guide the backing plate 11 of the friction pad 10 in the axial direction of the disk 1 via the convex hook portions 11A, 11B. Further, each of the radially urging plate portions 14C urges the backing plate 11 of each friction pad 10 outward in the radial direction of the disk 1 by being elastically contacted to the hook portion 11A, 11B of each friction pad 10 (backing plate 11) within each of the pad guides 4 of the carrier 2. With this configuration, rattling of each of the friction pads 10 is suppressed. Here, the radially urging plate portion 14C has the approximately similar configuration to that of a later-mentioned radially urging portion 44 which is illustrated in FIGS. 16 and 17.

The urging spring 15 is arranged between the hook portion 11A (side face part) to be the disk rotationally entering side at the time of vehicle forward movement and the torque receiving portion 5 (opposed face of the mounting member) of the carrier 2 opposed thereto. The urging spring 15 constitutes an urging means to urge the friction pad 10 toward the rotationally exiting side of the disk 1.

Figure 8:
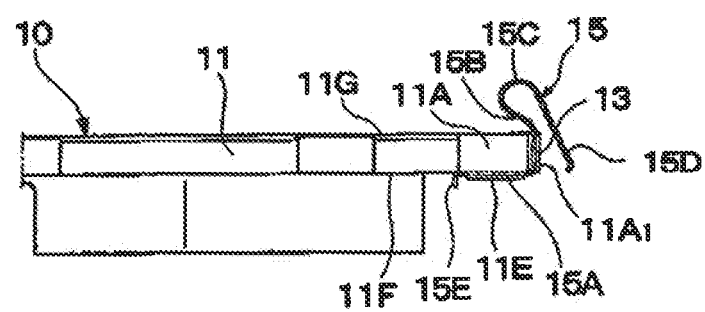
FIG. 8 is a plane view of the friction pad and the urging spring in FIG. 7 viewing from the upper side.

Here, the urging spring 15 is formed by performing bending (press molding) on a stainless steel plate and the like having elasticity, as illustrated in FIGS. 7 and 8. Then, the spring constant k1 of the urging spring 15 is set to satisfy the relation of the following Equation 1.

$$0 < k1 < k \qquad \text{[Equation 1]}$$

$$k = 4\pi^2 \times f^2 \times m \qquad \text{[Equation 2]}$$

In this case, the spring constant k of Equation 2 is acquired from the mass m of the friction pad 10 and the eigenfrequency f when the caliper 6 vibrates as a rigid body in a state of being mounted to the carrier 2 (mounting member) in the case that the caliper 6 is treated as a vibrating source as a factor of braking noise. Then, the spring constant k1 of the urging spring 15 is set to be a value smaller than the spring constant k of Equation 2 and larger than zero, for example, by appropriately adjusting the plate thickness t. For example, the spring constant k of the above Equation 2 is acquired as follows when the eigenfrequency f is 200 Hz and the mass m is 0.2 kg.

$$k = 3.16 \times 10^5 \, \text{N/m} \qquad \text{[Equation 3]}$$

Here, the above eigenfrequency f is possible to be determined by performing a shaking test to measure generated vibration with measuring equipment by vibrating the caliper 6 with a hammer and the like in a state that the caliper 6 is mounted to the vehicle and the carrier 2. The eigenfrequency of the caliper 6 measured by such as shaking test has a range between 200 Hz and 500 Hz.

Figure 9:
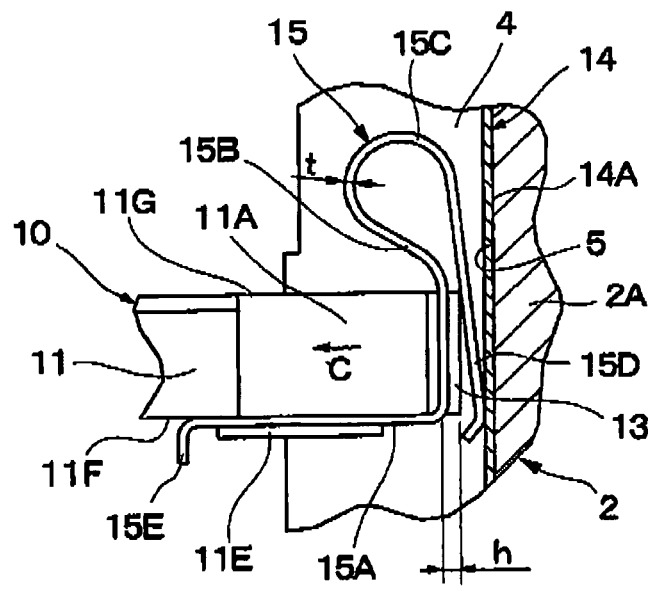
FIG. 9 is a main part sectional view which enlarges and illustrates a part indicated by arrow IX in FIG. 4.

As illustrated in FIGS. 7 to 9, the urging spring 15 is configured to include a mounting portion 15A, a first extending portion 15B, a folded portion 15C and a second extending portion 15D. The mounting portion 15A is to be fixed and mounted to the front face 11F side of the friction pad 10 (backing plate 11) by the caulking portion 11E. The first extending portion 15B extends toward the other face (back face 11G) side being the opposite side to the one face (front face 11F) of the backing plate 11 having the base end side connected (integrally formed) to the mounting portion 15A in the direction being apart from the disk 1 via the concave groove 13. The folded portion 15C is integrally formed at the top end side of the first extending portion 15B and is folded to be arc-shaped (i.e., to be U-shaped or C-shaped) toward the direction approaching to the disk 1 at the back face 11G side of the backing plate 11. The second extending portion 15D extends from the top end side of the folded portion 15C to the front face 11F side of the backing plate 11 in the direction approaching to the disk 1 and the disk 1 contacted (elastically contacted) to the torque receiving portion 5 of the carrier 2 in a state of elastic deformation via the guide plate portion 14A of the pad spring 14.

The mounting portion 15A of the urging spring 15 is fixed to the hook portion 11A side of the backing plate 11 being the rotationally entering side of the disk 1 via the caulking portion 11E and is mounted in a state of being face-contacted (closely contacted) widely to the front face 11F of the hook portion 11A. The first extending portion 15B extends being inclined obliquely to the disk axial direction and the circumferential direction inflected to be a dogleg shape toward the back face 11G side of the hook portion 11A after being inflected to be L-shaped so as to be interfolded into the concave groove 13 of the backing plate 11 from the top end side of the mounting portion 15A.

The folded portion 15C is formed by being folded so as to be folded back to be arc-shaped at a position placed interiorly in the disk circumferential direction relative to the end face 11A1 of the hook portion 11A of the backing plate 11 opposed to the torque receiving portion 5 of the carrier 2. The second extending portion 15D extends from the top end side of the folded portion 15C in the direction approaching to the disk 1 being inclined obliquely toward the front face 11F side so as to pass over the concave groove 13 of the backing plate 11 from the outside.

Figure 4:
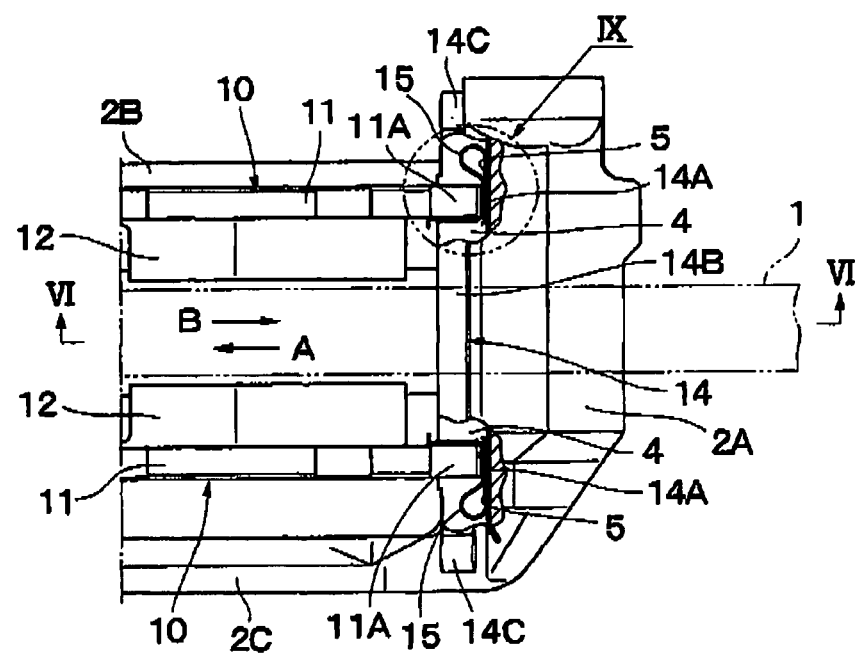
FIG. 4 is a partially sectioned plane view which illustrates a mounting member, a friction pad, a pad spring, an urging spring and the like in a state that a caliper in FIG. 1 is removed.

As illustrated in FIGS. 4, 9 and 10, the second extending portion 15D abuts to the torque receiving portion 5 of the carrier 2 in a state of elastic deformation via the guide plate portion 14A of the pad spring 14.

By fixing the mounting portion 15A at the hook portion 11A side of the backing plate 11, the urging spring 15 is supported to the friction pad 10 in a cantilevered state as illustrated in FIG. 9 when braking is not operated and when braking is operated at the time of vehicle forward movement. On the other hand, when braking is operated at the time of vehicle backward movement, the cantilevered state is to be maintained by accommodating the second extending portion 15D into the concave groove 13 of the hook portion 11A along with the first extending portion 15B even when the urging spring 15 is largely deflected and deformed as illustrated in FIG. 10 while the hook portion 11A of the friction pad 10 (backing plate 11) is contacted to the torque receiving portion 5 of the carrier 2 (guide plate portion 14A of the pad spring 14).

Further, also as illustrated in FIG. 7, the urging spring 15 is arranged at a position that is placed outside in the radial direction from the center position of the hook portion 11A in the width direction (disk radial direction). With this configuration, the urging spring 15 is capable of urging the friction pad 10 toward the disk rotationally exiting side at the position placed externally in the radial direction from the center position of the hook portion 11A in the width direction and capable of suppressing occurrence of couple force escaping at the time of braking.

The urging spring 15 is provided with an abrasion detector 15E at a fixing position fixed to the backing plate 11 of the friction pad 10, that is, at the vicinity of the mounting portion 15A (end part of the opposite side to the first extending portion 15B sandwiching the mounting portion 15A). Here, the abrasion detector 15E is formed by folding the base end side of the mounting portion 15A to be L-shaped along the thickness direction of the lining 12, and then, performs wear detection by being contacted to the disk 1 when the lining 12 is largely worn.

The disk brake according to the present embodiment is configured as described above. In the following, the operation thereof will be described.

First, at the time of braking operation of the vehicle, the piston is slid and displaced toward the disk 1 by supplying brake fluid pressure to an inner leg portion 6A (cylinder) of the caliper 6, so that the friction pad 10 of the inner side is pressed to one side of the disk 1. Then, at that time, since the caliper 6 receives pressing counterforce from the disk 1, the entire caliper 6 is slid and displaced toward the inner side against the arm portion 2A of the carrier 2 and the outer leg portion 6C presses the friction pad 10 of the outer side to the other side face of the disk 1.

Accordingly, the friction pads 10 of the inner side and the outer side are capable of strongly sandwiching the disk 1 rotating in the direction of arrow A in FIGS. 1 to 3 (at the time of vehicle forward movement) between the friction pads 10 from both sides in the axial direction and capable of applying braking force to the disk 1. Then, when the braking operation is released, since the fluid pressure supply to the piston is discontinued, the friction pads 10 of the inner side and the outer side are to be apart from the disk 1 and return anew to the non-braking state.

When braking and releasing (non-braking), the hook portion 11A located at the rotationally entering side of the disk 1 out of the hook portions 11A, 11B of the friction pad 10 is urged to the direction of arrow C in FIGS. 2, 3, 5, 6 and 9 by the urging spring 15. Accordingly, the friction pad 10 is continuously urged to the rotationally exiting side of the disk 1 (to the direction of arrow A in FIG. 2) with weak force. Then, the hook portion 11B located at the rotationally exiting side of the disk 1 is elastically pressed to the torque receiving portion 5 of the pad guide 4 via the guide plate portion 14A of the pad spring 14 with the urging force thereof.

Accordingly, rattling of the friction pad 10 in the circumferential direction of the disk 1 due to vibration and the like during vehicle movement can be restricted by the urging spring 15 arranged between the hook portion 11A of the disk rotationally entering side and the torque receiving portion 5. Then, when braking operation is performed at the time of vehicle forward movement, the braking torque (rotational torque in the direction of arrow A) which is received by the friction pad 10 from the disk 1 can be received by the arm portion 2A (torque receiving portion 5 of the pad guide 4) of the rotationally exiting side.

Accordingly, the hook portion 11B located at the disk rotationally exiting side of the friction pad 10 continues to be contacted to the torque receiving portion 5 of the pad guide 4 via the guide plate portion 14A. Moreover, the hook portion 11B at the rotationally exiting side is to be in a state without clearance as being contacted to the guide plate portion 14A due to action of the urging spring 15 before the braking operation. Therefore, it will not occur that the friction pad 10 is moved by the braking torque to generate noise.

The hook portions 11A, 11B of the friction pad 10 are slidably inserted into the pad guides 4, 4 located at the rotationally entering side and the rotationally exiting side of the disk 1 via the guide plate portion 14A of the pad spring 14, and then, are urged outward in the radial direction of the disk 1 by the respective radially urging plate portion 14C. With this configuration, the hook portions 11A, 11B of the friction pad 10 can be elastically pressed to the face side (upper face in the drawing) of the outward in the disk radial direction of the guide plate portion 14A.

Accordingly, rattling of the friction pad 10 in the radial direction of the disk 1 due to vibration and the like during movement can be restricted by the radially urging plate portion 14C of the pad spring 14. Then, when braking operation is performed, the friction pads 10 of the inner side and the outer side can be smoothly guided in the disk axial direction along the guide plate portion 14A while maintaining the hook portions 11A, 11B of the friction pad 10 to be slide-contacted to the upper face side of the guide plate portion 14A.

Here, with a disk brake of a type having the hook portions 11A, 11B of the friction pad 10 (backing plate 11) slidably inserted respectively into the pad guide 4 of the carrier 2 (so-called embedded type), it is required to take countermeasures against braking noise at the time of slow braking. However, presently, only first-aid treatment such as putting grease on the torque receiving portion 5 of the carrier 2 and affixing a double-stick tape, for example, is taken to counter the braking noise at the time of slow braking.

The inventors devoted themselves to study countermeasures against the braking noise at the time of slow braking. Through this study, it has been confirmed that occurrence of the so-called braking noise can be suppressed by setting the spring constant k1 of the urging spring 15 to urge the friction pad 10 toward the rotational exiting side of the disk 1 to satisfy the above Equation 1 and Equation 2. This is because the resonance frequency of the friction pad 10 generated by the urging spring 15 can be shifted from the eigenfrequency f when the caliper 6 vibrates as a rigid body in a state of being mounted to the carrier 2 (mounting member) in the case that the caliper 6 is treated as a vibrating source.

That is, at the time of braking operation in the vehicle forward moving direction, the hook portion 11B located at the disk rotationally exiting side of the friction pad 10 receives the braking torque from the disk 1 with the torque receiving portion 5 in a state of being elastically pressed to the torque receiving portion 5 of the pad guide 4 (guide plate portion 14A of the pad spring 14) located at the disk rotationally exiting side due to action of the urging spring 15 arranged at the hook portion 11A of the rotationally entering side. Accordingly, since the friction pad 10 and the arm portion 2A of the carrier 2 located at the disk rotationally exiting side becomes to be one rigid body, the spring constant k2 when the deformation of the arm portion 2A is treated as a spring has the characteristic as indicated by a characteristic line 16 (k2=2×10⁸ N/m) in FIG. 11, for example. With the characteristic of the spring constant k2 as described above, since the resonance frequency of the friction pad 10 is to be far from the eigenfrequency f of the caliper 6, it has been confirmed by a shaking test and the like that the occurrence of the braking noise can be suppressed.

At the time of braking operation in the vehicle reversing direction (backward movement direction), the urging spring 15 transmits the braking torque to the torque receiving portion 5 in a cantilevered state as illustrated in FIG. 9 until the hook portion 11A of the friction pad 10 (backing plate 11) is to be contacted to the torque receiving portion 5 (guide plate portion 14A of the pad spring 14) of the carrier 2. Then, while the braking torque is transmitted only by the urging spring 15, it is possible to avoid the resonance frequency of the friction pad 10 causing the braking noise by setting the spring constant k1 of the urging spring 15 to be smaller than a characteristic line 17 indicated in FIG. 11 (spring constant k obtained through the above Equation 2 and Equation 3, for example, k=3.16×10⁵ N/m), for example. In FIG. 11, the inclination degree of each line of the spring characteristic denotes the spring constant. An initial setting load is applied to the urging spring 15 when the friction pad 10 is mounted to the carrier 2. Here, largeness of the initial setting load does not affect the spring constant of the urging spring 15. Therefore, respective characteristic lines are to be extended from the reference point indicated in FIG. 11 despite of the above initial setting load.

Accordingly, in the present embodiment, the spring constant k1 of the urging spring 15 is set to the characteristic along the characteristic line 18 in FIG. 11 so as to satisfy the relation of the above Equation 1 (0<k1<k). That is, while the braking torque is transmitted only by the urging spring 15, the spring constant k1 is configured to be small to the extent of k1=7.2×10⁴ N/m, for example. Here, a characteristic line 19 indicated by a chain line shows the characteristic of the spring constant of an anti-rattle spring in JP-A No. 10-331883. The characteristic line 19 has a spring characteristic of a cantilevered state before an inflection point 19A, so that the spring constant thereof is larger than the above spring constant k. Therefore, there is a possibility of occurrence of the braking noise caused by resonance of the friction pad with the caliper vibrating at the above eigenfrequency f. In addition, after the inflection point 19A, the spring characteristic is in a double-supported state and the spring constant thereof is larger than the spring constant in the cantilevered state. Accordingly, the spring constant of the spring characteristic in such a double-supported beam state is larger than the above spring constant k. Therefore, there is a possibility of occurrence of the braking noise caused by resonance of the friction pad with the caliper vibrating at the above eigenfrequency f.

The spring constant k1 of the urging spring 15 is set to be relatively small. Accordingly, right after braking operation, the hook portion 11A of the friction pad 10 (backing plate 11) is contacted to the torque receiving portion 5 of the carrier 2 (guide plate portion 14A of the pad spring 14) and braking torque from the disk 1 is received at the torque receiving portion 5. Even when the hook portion 11A is contacted to the torque receiving portion 5 and the urging spring 15 is largely deflected and deformed as illustrated in FIG. 10, the urging spring 15 keeps the cantilevered state. Accordingly, the apparent spring constant k1 of the urging spring 15 rises as indicated by a characteristic line portion 18A of the characteristic line 18 in FIG. 11 and is to be approximately parallel to the spring constant k2 (characteristic line 16 in FIG. 11) of combination of the arm portion 2A of the carrier 2 and the urging spring 15. Therefore, the resonance frequency of the urging spring 15 causing noise can be avoided and occurrence of the so-called braking noise including slow braking noise can be suppressed. In particular, the braking noise at a low frequency range of slow braking noise is apt to occur at a disk brake mounted on the rear side of the vehicle. Therefore, the urging spring 15 of the present embodiment is effective to be mounted to the disk brake of the rear side. Further, simply with the spring constant k1 of the urging spring 15, the occurrence of the braking noise can be suppressed by avoiding the resonance frequency against the eigenfrequency (approximately 2000 Hz) of three-diameter-node mode of the disk 1 in the case that the disk 1 is treated as a vibrating source as a factor of the braking noise. In this manner, by setting the spring constant k1 of the urging spring 15 to be smaller than the spring constant k which is acquired from the mass m of the friction pad 10 and the eigenfrequency f when the caliper 6 vibrates as a rigid body in a state of being mounted to the carrier 2 (mounting member), it becomes possible as well to suppress the braking noise caused by other vibrating sources as the factors thereof.

Further, in the present embodiment, the urging spring 15 is formed as an integral portion constituted with the mounting portion 15A, the first extending portion 15B, the folded portion 15C and the second extending portion 15D as described above by performing bending on a metal plate (for example, a stainless steel plate) having elasticity. Accordingly, by appropriately adjusting the thickness t of the urging spring 15, the spring constant k1 of the urging spring 15 can be set to satisfy the relation of the above Equation 1.

Figure 5:
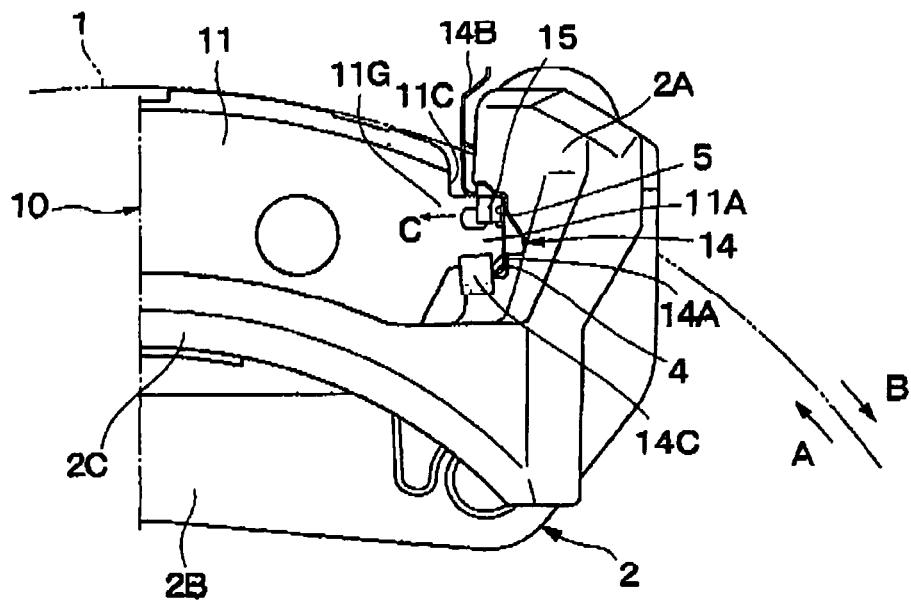
FIG. 5 is a front view of the mounting member, the friction pad, the pad spring, the urging spring and the like in FIG. 4 viewing from the front side.

Further, as illustrated in FIGS. 5 to 7, the urging spring 15 is configured to be arranged at a position that is placed outside in the radial direction from the center position of the hook portion 11A in the width direction (disk radial direction). With this configuration, the urging spring 15 is capable of urging the friction pad 10 in the direction where the moment accompanied with the braking torque becomes positive at the position placed externally in the radial direction from the center position of the hook portion 11A in the width direction and capable of suppressing occurrence of couple force escaping at the time of braking.

Further, the urging spring 15 can be arranged in a compact manner between the hook portion 11A being the disk rotationally entering side at the time of vehicle forward movement out of the hook portions 11A, 11B of the friction pad 10 (backing plate 11) and the torque receiving portion 5 of the carrier 2 opposed thereto. Then, the second extending portion 15D of the urging spring 15 is formed to be in the cantilevered state as the end face 11A1 of the hook portion 11A is contacted to the torque receiving portion 5 (guide plate portion 14A) at the time of vehicle backward movement. Accordingly, the spring constant k1 of the urging spring 15 can be easily set to a small value as indicated by the above Equations 1 to 3 and noise occurrence such as braking noise at the time of braking in the vehicle backward moving direction can be suppressed.

Further, since the urging spring 15 is configured to be arranged to the front face 11F side of the backing plate 11 of the friction pad 10 where the lining 12 is disposed, vehicle space can be effectively utilized and the spring constant required for the urging spring 15 and the necessary load (spring force) can be easily ensured. Further, since the urging spring 15 is arranged to be fixed to the backing plate 11 of the friction pad 10, the urging spring 15 can be mounted to the carrier 2 as a sub-assembly state previously assembled to the friction pad 10. Accordingly, assembling operability can be improved.

In particular, in the present embodiment, the urging spring 15 is constituted with the mounting portion 15A being fixed and mounted to the front face 11F side of the backing plate 11, the first extending portion 15B extending toward the back face 11G side of the backing plate 11 from the top end side of the mounting portion 15A in the direction away from the disk 1, the folded portion 15C being formed at the top end side of the first extending portion 15B and being folded to be arc-shaped toward the direction approaching to the disk 1 at the back face 11G side of the backing plate 11, and the second extending portion 15D extending from the top end side of the folded portion 15C in the direction approaching to the disk 1 and being elastically contacted to the torque receiving portion 5 side of the carrier 2 in an elastic deformation state.

Accordingly, the spring length of the urging spring 15 can be set to be sufficiently long with the mounting portion 15A, the first extending portion 15B, the folded portion 15C and the second extending portion 15D, and the spring constant required for the urging spring 15 (above Equation 1 and Equation 2) can be easily ensured. In addition, the necessary load (spring force) as the urging spring 15 can be easily ensured and vehicle space can be effectively utilized in the state that the urging spring 15 is mounted to the friction pad 10.

Then, with the urging spring 15 formed by utilizing a stainless steel plate, for example, the second extending portion 15D located at the top end side (free end side) thereof is elastically contacted to the torque receiving portion 5 of the carrier 2 via the guide plate portion 14A of the pad spring 14 in an elastic deformation state. Accordingly, the sliding contact therebetween can be smoothened and occurrence of so-called judder can be excellently suppressed.

Further, as illustrated in FIG. 9 as well, for example, the folded portion 15C of the urging spring 15 is configured to be folded to be arc-shaped at a position placed interiorly in the disk circumferential direction (in the direction of arrow C) relative to the end face 11A1 of the hook portion 11A of the backing plate 11. Accordingly, the folded portion 15C and the like of the urging spring 15 can be easily arranged by effectively utilizing the space formed with the pad guide 4 of the carrier 2. In addition, with this configuration, the spring length of the urging spring 15 can be sufficiently ensured, so that the urging force (spring force) can be stabilized.

Further, the urging spring 15 is configured to include the abrasion detector 15E at the vicinity of the mounting portion 15A to be fixed to the backing plate 11 of the friction pad 10. Accordingly, the urging spring 15 as a single component can also function as a detecting sensor to detect wear of the lining 12, so that the parts can be reduced.

Figure 13:
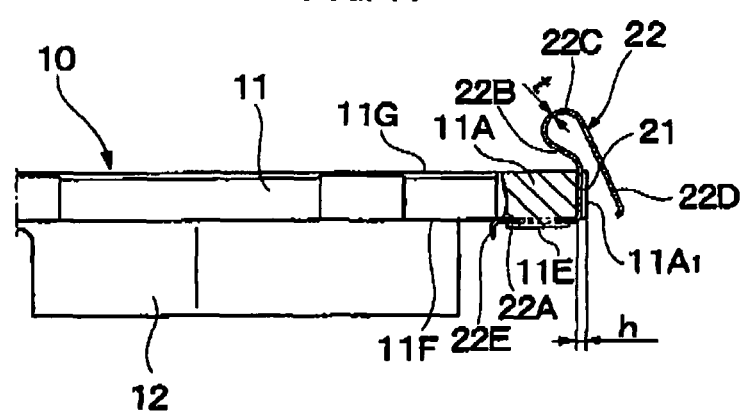
FIG. 13 is a partially sectioned plane view of the friction pad and the urging spring viewing from arrows XIII-XIII in FIG. 12.

Next, the second embodiment of the present invention is illustrated in FIGS. 12 and 13. The feature of the present embodiment is that the mounting position of the urging means is arranged at the vicinity of the center in the width direction of the torque transmitting portion of the friction pad (at the vicinity of the center in the disk radial direction). Here, in the second embodiment, the same reference numeral is given to the same structural element as the first embodiment and the description thereof will not be repeated.

As illustrated in the drawings, a concave groove 21 is arranged at the hook portion 11A of the friction pad 10 (backing plate 11). Similar to the concave groove 13 described in the first embodiment, the concave groove 21 is formed by partially cutting out the end face 11A1 of the top end side (projecting side) of the hook portion 11A and constitutes an accommodation groove for a later-mentioned urging spring 22. Then, as illustrated in FIG. 13, the groove depth h of the concave groove 21 against the end face 11A1 of the hook portion 11A is set to a dimension being approximately twice of the plate thickness t of the later-mentioned urging spring 22 (h≈2×t).

Here, the concave groove 21 is different from the concave groove 13 described in the first embodiment in the point of being arranged at the position to be the vicinity of the center in the width direction (disk radial direction) of the hook portion 11A. Then, extending portions 22B, 22D of the later-mentioned urging spring 22 are to be accommodated (inserted) in the concave groove 21.

The urging spring 22 (urging means) urges each friction pad 10 toward the rotationally exiting side of the disk 1. The urging spring 22 is formed similarly to the urging spring 15 described in the first embodiment and the spring constant k1 is set to satisfy the above Equation 1 and Equation 2. Then, the urging spring 22 is configured to include a mounting portion 22A, the first extending portion 22B, a folded portion 22C, the second extending portion 22D and an abrasion detector 22E.

Here, the urging spring 22 in this case is different from the urging spring 15 described in the first embodiment in the point of being arranged at the position to be the vicinity of the center in the width direction (disk radial direction) of the hook portion 11A similarly to the above concave groove 21.

In this manner, also in the second embodiment structured as described above, the similar operational effects to those of the above first embodiment can be obtained. Accordingly, noise occurrence such as braking noise at the time of braking in the vehicle backward moving direction can be suppressed.

Figure 14:
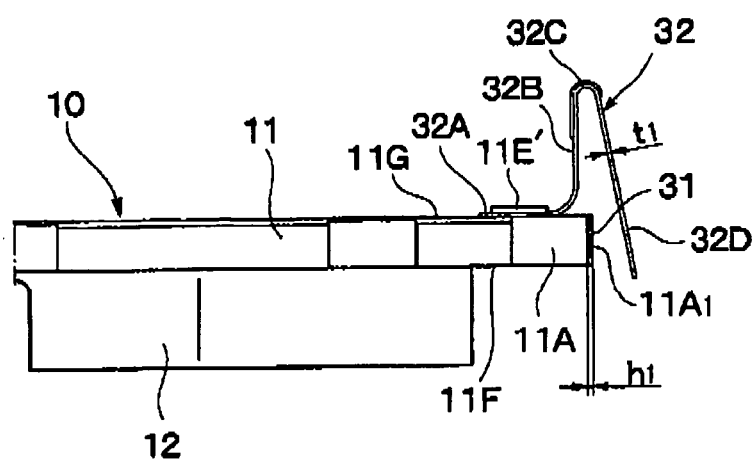
FIG. 14 is a front view which illustrates a state that the urging spring according to a third embodiment is mounted to the friction pad.

Next, the third embodiment of the present invention is illustrated in FIG. 14. The feature of the present embodiment is that the urging means is arranged to be fixed to the other face side of the backing plate of the friction pad being the opposite side to the lining. Here, in the third embodiment, the same reference numeral is given to the same structural element as the first embodiment and the description thereof will not be repeated.

As illustrated in the drawing, a concave groove 31 is arranged at the hook portion 11A of the friction pad 10 (backing plate 11). Similar to the concave groove 13 described in the first embodiment, the concave groove 31 is formed by partially cutting out the end face 11A1 of the top end side (projecting side) of the hook portion 11A and constitutes an accommodation groove to accommodate an extending portion 32D of a later-mentioned urging spring 32. Here, the concave groove 31 in this case is different from the concave groove 13 described in the first embodiment in the point that the groove depth h1 of the concave groove 31 against the end face 11A1 of the hook portion 11A is set to be a dimension being approximately the same as the plate thickness t1 of the later-mentioned urging spring 32 (h1≈t1).

The urging spring 32 (urging means) urges each friction pad 10 toward the rotationally exiting side of the disk 1. The urging spring 32 is formed similarly to the urging spring 15 described in the first embodiment and the spring constant k1 is set to satisfy the above Equation 1 and Equation 2. Here, the urging spring 32 in this case is different from the first embodiment in the point of being arranged at the other face side (back face 11G side) of the backing plate 11 of the friction pad 10 being opposite to the lining 12.

That is, the urging spring 32 is configured to include a mounting portion 32A being fixed and mounted to the back face 11G side of the friction pad 10 (backing plate 11) by a caulking portion 11E', a first extending portion 32B having the base end side connected (integrally formed) to the mounting portion 32A and extending in the direction away from the disk 1 at the back face 11G side of the backing plate 11, a folded portion 32C integrally formed with the top end side of the first extending portion 32B and folded to be arc-shaped (for example, to be U-shaped or C-shaped) toward the direction approaching to the disk 1 at the back face 11G side of the backing plate 11, and a second extending portion 32D extending in the direction approaching to the front face 11F side of the backing plate 11 from the top end side of the folded portion 32C and contacted (elastically contacted) to the torque receiving portion 5 of the carrier 2 via the guide plate portion 14A of the pad spring 14 in an elastic deformation state.

Then, the urging spring 32 is formed by utilizing plate material (for example, a stainless steel plate and the like) having plate thickness of t1. When the urging spring 32 is largely deflected and deformed, the second extending portion 32D is accommodated (inserted) in the concave groove 31 of the hook portion 11A. Further, the folded portion 32C of the urging spring 32 is configured to be folded to be arc-shaped at a position that is placed outside in the disk circumferential direction against the end face 11A1 of the hook portion 11A of the backing plate 11.

Here, the urging spring 32 is continuously supported to the friction pad 10 in a cantilevered state by fixing the mounting portion 32A to the hook portion 11A side of the backing plate 11 as being similar to the urging spring 15 of the above first embodiment.

In this manner, also in the third embodiment structured as described above, the similar operational effects to those of the above first embodiment can be obtained. Accordingly, noise occurrence such as braking noise at the time of braking vehicles in a backward moving direction can be suppressed.

As described above, the urging spring 32 is constituted with the mounting portion 32A, the first extending portion 32B, the folded portion 32C and the second extending portion 32D. With this configuration, the spring length of the urging spring 32 can be sufficiently ensured and the urging force (spring force) can be stabilized. In addition, by arranging the urging spring 32 to be fixed to the back face 11G side of the backing plate 11, the occupied area of the lining 12 arranged at the front face 11F side of the backing plate 11 can be enlarged and the shape of the lining 12 can be easily changed.

Figure 15:
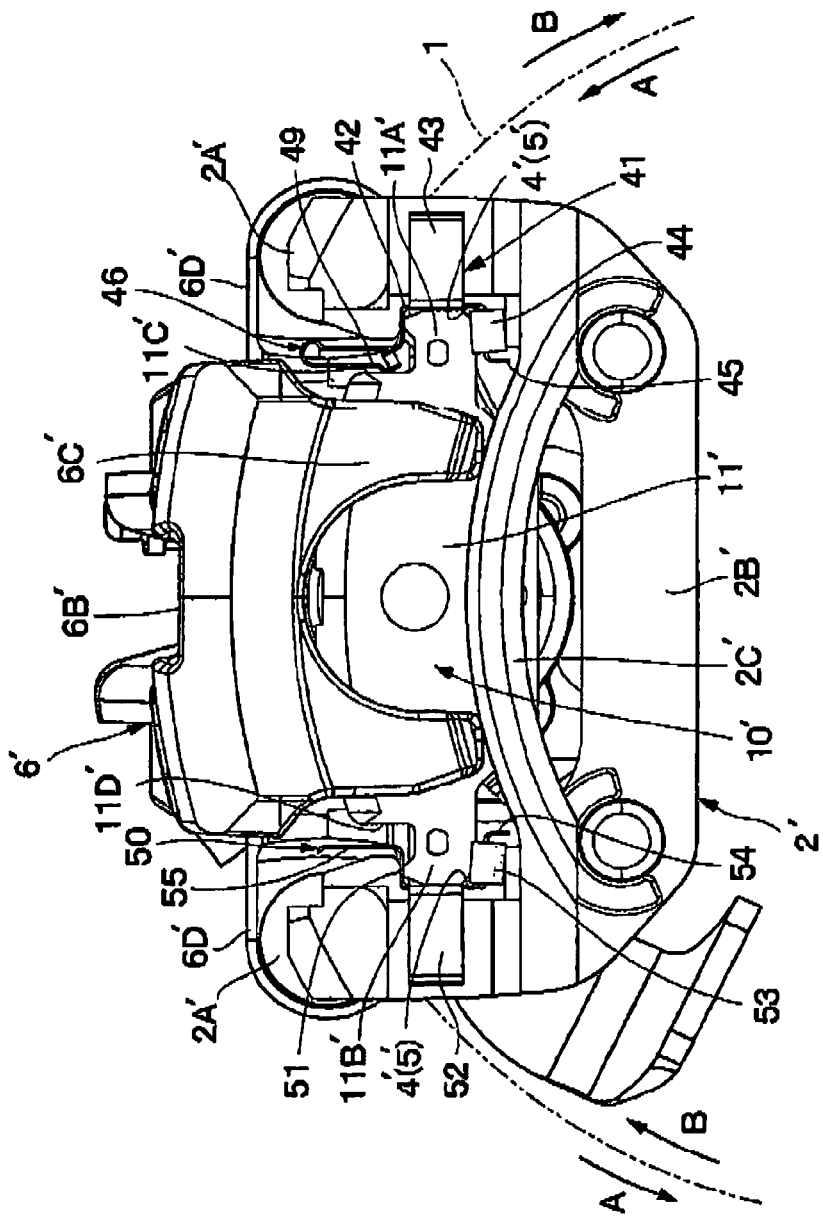
FIG. 15 is a front view which illustrates the disk brake according to a fourth embodiment.

Next, the fourth embodiment of the present invention is illustrated in FIGS. 15 to 17. The feature of the present embodiment is that the urging means is formed integrally with the pad spring arranged at the mounting member.

Here, in the fourth embodiment, the same reference numeral is given to the same structural element as the above first embodiment and the description thereof will not be repeated. Further, respective structural elements such as carrier 2', the pad guide 4', the torque receiving portion 5', the caliper 6' and the friction pad 10' are substantially the same as those of the first embodiment. Here, a sign ' is respectively added thereto and the further description will not be repeated.

In the drawings, the pad spring 41 of one side is arranged at the rotationally entering side of the disk 1. The pad spring 41 is configured to be almost the same as the pad spring 14 described in the first embodiment except that a later-mentioned urging spring 46 is formed integrally therewith. Then, the pad spring 41 is mounted to the arm portion 2A' located at the rotationally entering side of the disk 1 out of the respective arm portions 2A' of the carrier 2'. The pad spring 41 elastically supports the respective friction pads 10' of the inner side and the outer side with a later-mentioned pad spring 50 of the other side and smoothens the sliding displacement of the friction pads 10' in the disk axial direction.

Here, the pad spring 41 is integrally formed by folding a stainless steel plate having elasticity as illustrated in FIGS. 16 and 17 by utilizing means such as press molding. Then, the pad spring 41 is constituted with a later-mentioned guide plate portion 42, a retaining plate portion 43, a radially urging portion 44, an urging spring 46 and the like.

A pair of guide plate portions 42, 42 are arranged to be fitted into each of the pad guides 4' of the carrier 2. Each of the guide plate portions 42 is configured to be similar to the guide plate portion 14A of the pad spring 14 described in the first embodiment and is formed by being folded to be approximately U-shaped from the base end side (lower end side in FIG. 16) of a later-mentioned extending plate portion 47. One guide plate portion 42 of the pair of guide plate portions 42, 42 is mounted to be fitted into the pad guide 4' of the outer side illustrated in FIG. 15, and the other guide plate portion 42 is mounted to be fitted to the pad guide of the inner side (not illustrated).

Here, the guide plate portion 42 of the pad spring 41 is constituted with an upper face plate 42A and a lower face plate 42B which are respectively opposed to an upper wall face and a lower wall face of the pad guide 4' as illustrated in FIG. 15 and a backing plate 42C which connects the upper face plate 42A and the lower face plate 42B and which is contacted to a back side wall face (torque receiving portion 5') of the pad guide 4'. The backing plate 42C is formed to be plate-shaped having larger width (being wider in the disk axial direction) than the upper face plate 42A and the lower face plate 42B, and then, the later-mentioned retaining plate portion 43 is formed respectively at both sides in the width direction.

The pair of retaining plate portions 43, 43 retain the pad spring 41 in the retaining state against each of the pad guides 4' of the carrier 2. Each of the retaining plate portions 43 is formed by being bent to be L-shaped from the backing plate 42C of the guide plate portion 42 toward the back face side (outer side in the disk circumferential direction). Then, the retaining plate portions 43 retain the pad spring 41 in a retaining state against each of the pad guides 4' of the carrier 2' by sandwiching the arm portion 2A' of the carrier 2' from both sides in the axial direction of the disk 1.

The radially urging portions 44, 44 urge each friction pad 10' toward the outer side in the radial direction of the disk 1. Each of the radially urging portions 44 is constituted being similar to the radially urging plate portion 14C of the pad spring 14 described in the first embodiment. That is, each of the radially urging portions 44 is formed to extend in the axial direction of the disk 1 between the guide plate portion 42 and the hook portion 11A' of the friction pad 10' and urges the hook portion 11A' of the friction pad 10' toward the outer side in the radial direction of the disk 1.

Then, the radially urging portion 44 projects toward the outer side in the width direction (disk axial direction) from the lower face plate 42B of the guide plate portion 42 and constituted with a base plate portion 44A extending approximately in parallel to the lower face plate 42B, an approximately C-shaped fold-back portion 44B and an urging piece portion 44C which are formed integrally with the base plate portion 44A, and the like.

Here, the base plate portion 44A, the fold-back portion 44B and the urging piece portion 44C of the radially urging portion 44 are formed to be elongated plate-shaped extending in the disk axial direction from the outer side end in the width direction of the lower face plate 42B. Then, the fold-back portion 44B is formed as an arc-shaped folded portion by folding back a midpoint portion in the length direction toward the outer side in the disk radial direction to be approximately U-shaped or approximately C-shaped.

Further, the urging piece portion 44C is formed as an elongated plate-shaped spring piece that extends and inclines obliquely toward the outer side in the disk radial direction from the top end side of the fold-back portion 44B as illustrated by the two-dot chain lines in FIGS. 16 and 17, and then, the top end side thereof is extended to the position close to the lower face plate 42B of the guide plate portion 42 to be a free end. Then, in the state that the hook portion 11A' of the friction pad 10' is assembled into the guide plate portion 42 as illustrated in FIG. 15, the urging piece portion 44C of the radially urging portion 44 is elastically deflected and deformed so as to be pressed toward the lower face plate 42B of the guide plate portion 42, as illustrated by solid lines in FIGS. 16 and 17.

With this configuration, the urging piece portion 44C of the radially urging portion 44 is arranged to extend in the disk axial direction between the lower face plate 42B of the guide plate portion 42 and the hook portion 11A' of the friction pad 10' and urges the hook portion 11A' of the friction pad 10' with the elastic counterforce thereof toward the outer side in the disk radial direction.

Then, the hook portion 11A' of the friction pad 10' is elastically pressed toward the upper face plate 42A (upper side wall face of the pad guide 4') of the guide plate portion 42 with the urging force (elastic counterforce) of the radially urging portion 44. Accordingly, rattling of the hook portion 11A' of the friction pad 10' within the pad guide 4' (guide plate portion 42) in the disk radial direction and the like is suppressed.

The fold plate portions 45, 45 are formed integrally with the guide plate portion 42 of the pad spring 41. Each of the fold plate portions 45 is formed to be folded approximately L-shaped inward in the disk radial direction from the top end of the lower face plate 42B of the guide plate portion 42.

An urging spring 46 urges each friction pad 10' in the circumferential direction of the disk 1. As illustrated in FIGS. 15 to 17, the urging spring 46 is formed by extending toward the outer side in the radial direction of the disk 1 from the guide plate portion 42 and folding back the extending end side inward in the radial direction of the disk 1. The urging spring 46 urges the friction pad 10' in the circumferential direction (direction of arrow A) of the disk 1 by elastically pressing the flat face portion 11C' of the friction pad 10' (part positioning at the outer side in the radial direction of the disk 1 in the vicinity of the hook portion 11A').

Here, the urging spring 46 of the pad spring 41 is constituted with a pair of extending plate portions 47 extending outward in the radial direction of the disk 1 from the upper face plate 42A of each guide plate portion 42, a connecting plate portion 48 as a fold-back portion located at the top end side (extending end side) of each extending plate portion 47 and formed by being folded back to be arc-shaped (for example, approximately C-shaped or approximately U-shaped), and a pair of contacting plate portions 49 as the extending portions extending inward in the radial direction of the disk 1 from the top end side (fold-back end side) of the connecting plate portion 48 and arranged approximately in parallel to the above extending plate portion 47.

In this case, the connecting plate portion 48 of the urging spring 46 is formed to extend in the axial direction in a state of extending over the circumferential side of the disk 1 in order to integrally connect the pair of extending plate portions 47, the pair of contacting plate portions 49 and the like which are respectively apart in the bilateral direction (disk axial direction) as illustrated in FIG. 17. Then, the respective guide plate portions 42 of the pad spring 41 are connected to be integral with the connecting plate portion 48.

Further, the contacting plate portion 49 of the urging spring 46 has a pressing portion 49A at the top end side (free end side) inflected to be an approximate dogleg shape. As illustrated in FIG. 15, the pressing portion 49A is contacted in an elastic deformation state to the flat face portion 11C' of the friction pad 10' at a part being close to the hook portion 11A'. With this configuration, the urging spring 46 urges the flat face portion 11C' of the friction pad 10' in the circumferential direction of the disk 1 with the spring force having the spring constant k1 (see the above Equation 1 and Equation 2).

Further, the contacting plate portion 49 of the urging spring 46 has guide piece portions 49B, 49B integrally formed at a position that is placed outside in the width direction of the pressing portion 49A (disk axial direction). Then, the guide piece portions 49B function as the guide for the hook portion 11A', for example, when assembling the hook portion 11A' of the friction pad 10' into the guide plate portion 42 of the pad spring 41.

The other pad spring 50 is arranged at the exit side in the rotational direction of the disk 1. As illustrated in FIG. 15, the pad spring 50 is mounted to the arm portion 2A' located at the rotationally exiting side of the disk 1 out of the respective arm portions 2A' of the carrier 2'. The pad spring 50 elastically supports the friction pads 10' of the inner side and the outer side with the above pad spring 41 of the rotationally entering side and smoothens the sliding displacement of the friction pads 10'.

The pad spring 50 of the rotationally exiting side is constituted similarly to the above pad spring 41 of the rotationally entering side and is formed with a guide plate portion 51, a retaining plate portion 52, a radially urging portion 53, a fold plate portion 54 and the like, as illustrated in FIG. 15. Here, the pad spring 50 of the exit side in the rotational direction does not have an urging spring 46 like the pad spring 41 of the rotationally entering side but has a connecting plate portion 55 instead.

That is, the connecting plate portion 55 of the pad spring 50 has a similar function to the connecting plate portion 48 arranged at the pad spring 41 of one side. The connecting plate portion 55 is formed to extend in the axial direction in a state of passing over the circumference side of the disk 1 in order to integrally connect the pair of the guide plate portions 51 which are apart in the axial direction of the disk 1. Then, the respective guide plate portions 51 of the pad spring 50 are connected to be integral with the connecting plate portion 55.

In this manner, also in the fourth embodiment structured as described above, the similar operational effects to those of the above first embodiment can be obtained. In particular, since the urging spring 46 to urge the friction pad 10' in the circumferential direction (toward the rotationally exiting side) of the disk 1 is configured to be formed integrally with the pad spring 41, the parts can be reduced and assembling operability can be improved.

Further, the urging spring 46 urges the part positioning outward in the radial direction of the disk 1 (flat face portion 11C') from the hook portion 11A' of the friction pad 10' (backing plate 11') fitted into the pad guide 4' of the carrier 2' in a concavoconvex manner toward the circumferential direction of the disk 1. Accordingly, it is possible to suppress occurrence of so-called couple force escaping due to the moment accompanied with braking torque at the time of braking in the vehicle backward moving direction and to reduce occurrence of noise such as braking noise. In addition, since the urging spring 46 formed integrally with the pad spring 41 is configured to have the spring constant being set to a small value to avoid the resonance frequency causing braking noise, it is possible to suppress occurrence of noise such as braking noise at the time of braking in the vehicle backward moving direction.

Here, the above first embodiment has the configuration that the base end side of the urging spring 15 is arranged to be fixed to the hook portion 11A of the backing plate 11 and the top end side (extending portion 15D) of the urging spring 15 is elastically contacted to the torque receiving portion 5 of the carrier 2. However, the present invention is not limited to this.

For example, it is also possible to have the configuration that the urging spring (urging means) is formed integrally with the pad spring and the top end side (extending portion) thereof is elastically contacted to the torque transmitting side (hook portion side) of the friction pad. In this case, it is also possible to arrange the urging spring in a compact manner between the hook portion 11A of the friction pad 10 (backing plate 11) and the torque receiving portion 5 of the carrier 2. This is also the same in the second and third embodiments.

Further, in the above first embodiment, the configuration is exemplified that the pad guide 4 having a concave shape is formed at the arm portion 2A of the carrier 2 and the hook portions 11A, 11B to be the fitting portions of the backing plate 11 are formed to be convex. However, not limited to this, the present invention may have the configuration that a fitting portion having a concave shape is arranged at the backing plate of the friction pad and a pad guide having a convex shape is arranged at the arm portion of the mounting member, for example.

Further, in the above first embodiment, the configuration is exemplified that the back side wall face of the pad guide 4 having a U-shaped concave groove constitutes the torque receiving portion 5 as the torque receiving portion. However, not limited to this, the present invention is applicable to a disk brake of a type that a torque receiving portion as torque receiver is arranged at a position away from the pad guide (position being different from the pad guide), for example. This is also the same in the second to fourth embodiments.

Next, inventions included in the above embodiments will be described. In the above configuration, the urging means is arranged between the torque transmitting portion to be the disk rotationally entering side at the time of vehicle forward movement out of the respective torque transmitting portions of the friction pad and the torque receiving portion of the mounting member, and the friction pad is urged toward the disk rotationally exiting side by the extending portion elastically contacted to either of the torque transmitting portion or the torque receiving portion.

With this configuration, it is possible to arrange the urging means in a compact manner between the torque transmitting portion to be the disk rotationally entering side at the time of vehicle forward movement out of the respective torque transmitting portions of the friction pad and the torque receiving portion of the mounting member and to stabilize the urging force to urge the friction pad toward the disk rotationally exiting side.

Further, the extending portion of the urging means is formed to keep a cantilevered state until the torque transmitting portion abuts to the torque receiving portion of the mounting member when the vehicle moves backward. With this configuration, it is possible to easily set the spring constant of the urging means to a further small value and to reduce noise occurrence such as braking noise at the time of braking in the vehicle backward moving direction.

Further, the urging means is arranged to be fixed to the backing plate of the friction pad. With this configuration, the urging means can be mounted to the mounting member in a sub-assembled state of being previously assembled to the friction pad whereby the assembling operability can be improved.

Further, the urging means is arranged to be fixed to one face side of the backing plate of the friction pad where the lining is disposed. With this configuration, the spring constant required for the urging means and necessary load (spring force) are easily ensured and limited vehicle space can be effectively utilized.

The urging means is configured to include the mounting portion being fixed and mounted to one face side of the backing plate, the first extending portion having the base end side connected to the mounting portion and extending in the direction away from the disk toward the other face side to be the opposite side to the one face of the backing plate, the folded portion formed at the top end side of the first extending portion and folded to be arc-shaped toward the direction approaching to the disk at the other face side of the backing plate, and the second extending portion extending in the direction approaching to the disk from the top end side of the folded portion and elastically contacted to the mounting member side in an elastic deformation state.

With this configuration, the spring length of the urging means can be sufficiently ensured with the first extending portion, the folded portion and the second extending portion. Further, the spring constant required for the urging means can be easily ensures and the necessary load (spring force) can be easily ensured. Furthermore, the limited vehicle space can be effectively utilized.

Further, the folded portion of the urging means is configured to be folded to be arc-shaped at a position placed interiorly in the disk circumferential direction relative to the end face of the torque transmitting portion of the backing plate opposed to the torque receiving portion of the mounting member. With this configuration, the spring length of the urging means can be set to be sufficiently long and the urging force (spring force) can be stabilized. In addition, the limited vehicle space can be effectively utilized.

Further, the urging means is configured to include the abrasion detector to detect lining wear at the vicinity of a fixing position fixed to the backing plate of the friction pad. With this configuration, the urging means can function as the detecting sensor as well to detect the lining wear, so that the parts can be reduced.

The urging means is arranged to be fixed to the other face side of the backing plate of the friction pad to be opposite side to the lining. With this configuration, the urging means can be arranged to be fixed to the other face side of the backing plate and the occupied area of the lining arranged at the one face side of the backing plate can be enlarged.

Furthermore, the urging means is formed at the pad spring which is arranged at the mounting member. With this configuration, the urging means can be formed integrally with the pad spring and the parts count can be reduced. In addition, assembling operability can be improved.

What is claimed is:

1. A disk brake comprising:
   a mounting member fixed to a vehicle by extending over a disk;
   a friction pad including a lining made of friction material and a backing plate supported by the mounting member, the backing plate having a pair of lateral portions at both sides thereof in a disk circumferential direction, the pair of lateral portions having a torque transmitting portion for transmitting torque at braking to the mounting member;
   a caliper arranged slidably to the mounting member so as to press the friction pad to the disk; and
   an urging member including an extending portion urging the friction pad toward a disk rotationally exiting side, the extending portion being arranged between one lateral portion of the pair of lateral portions as a disk rotationally entering side at the time of vehicle forward movement and an opposed surface portion of the mounting member opposed to the one lateral portion, the torque transmitting portion of the one lateral portion including a concave groove facing the opposed surface portion, wherein the extending portion includes a first extending portion coupled to the backing plate and a second extending portion connected to the first extending portion via a folded portion, the second extending portion being configured to include a first face facing the mounting member and a second face facing the torque transmitting portion of the one lateral portion, and wherein the second extending portion extends from the folded portion in a direction opposite the first extending portion and is configured to elastically contact the opposed surface portion of the mounting member,
   wherein the urging member urges the friction pad toward the disk rotationally exiting side until the torque transmitting portion abuts to the mounting member upon the backward vehicle movement, and the friction pad is urged towards the disk rotationally exiting side only via the urging member until the torque transmitting portion abuts to the mounting member upon the backward vehicle movement,
   wherein the second extending portion is accommodated in the groove of the one lateral portion when the torque transmitting portion of the one lateral portion abuts to the mounting member upon the backward vehicle movement,
   wherein in a condition where the second extending portion is accommodated in the groove, the first face of the second extending portion keeps a contact with the mounting member while the second face of the second extending portion keeps a separation from the torque transmitting portion of the one lateral portion and the first extending portion, and
   wherein a position in which the second extending portion abuts to the mounting member, the second extending portion maintains the same.

2. The disk brake according to claim 1, wherein the second extending portion is arranged between the torque transmitting portion and a torque receiving portion of the mounting member facing the torque transmitting portion, and the second extending portion elastically contacts to the torque receiving portion.

3. The disk brake according to claim 2, wherein the extending portion keeps a cantilevered state via the second extending portion being accommodated in the groove along with the first extending portion when the torque transmitting portion abuts to the torque receiving portion upon the backward vehicle movement, and wherein the second face of the second extending portion keeps a clearance from the torque transmitting portion and the first extending portion in the cantilevered state.

4. The disk brake according to claim 1, wherein the extending portion keeps a cantilevered state when the torque transmitting portion abuts to the mounting member upon the backward vehicle movement.

5. The disk brake according to claim 1,
   wherein the urging member includes a mounting portion that is fixed to one surface side of the backing plate where the lining is disposed, and
   wherein the first extending portion is connected to the mounting portion at a base end side thereof, the first extending portion extending in a direction away from the disk toward the other surface side that is opposite to the one surface side of the backing plate; the folded portion is arranged at a top end side of the first extending portion and the folded portion is folded to be arc-shaped toward a direction approaching to the disk at the other surface side of the backing plate; and the second extending portion extends in a direction approaching from the top end side of the folded portion to the disk and the second extending portion contacting to the opposed surface of the mounting member in an elastic deformation state.

6. The disk brake according to claim 5, wherein the folded portion is folded to be arc-shaped at a position placed interiorly in a disk circumferential direction relative to an end surface of the one lateral portion facing the mounting member.

7. The disk brake according to claim 5, wherein the second extending portion keeps a cantilevered state when the torque transmitting portion abuts to the mounting member upon the backward vehicle movement.

8. The disk brake according to claim 1, wherein the urging member includes an abrasion detector detecting abrasion of the lining, the abrasion detector being arranged in the vicinity of a fixing position fixed to the backing plate.

9. The disk brake according to claim 1,
wherein the urging member is a single metal plate having elasticity, the urging member comprising a mounting portion fixed to one surface side of the backing plate to which the lining is disposed;
wherein the first extending portion is connected to the mounting portion at a base end side thereof and extends in a direction away from the disk toward the other surface side opposing to the one surface side of the backing plate, the first extending portion being arranged in the groove; the folded portion is formed at a top end side of the first extending portion and folded to be arc-shaped in a direction approaching to the disk on the other surface side of the backing plate; and the second extending portion being extended in a direction approaching from the top end side of the folded portion to the disk, contacting to the opposed surface in an elastic deformation state; and
wherein in the condition where the second extending portion is accommodated in the groove, the second face of the second extending portions keeps a clearance from the first extending portion.

10. The disk brake according to claim 5, wherein the urging member includes an abrasion detector detecting abrasion of the friction material, the abrasion detector being arranged in the vicinity of the mounting portion fixed to the backing plate of the friction pads.

11. The disk brake according to claim 1, wherein the torque transmitting portion of the backing plate is a convex hook portion each projecting from both sides of the backing plate in a disk circumferential direction, and the urging member is positioned at one side of the hook portion and placed outside in a disk radial direction from a center position of the hook portion.

12. The disk brake according to claim 4, wherein the torque transmitting portion of the backing plate is a convex hook portion each projecting from both sides of the backing plate in a disk circumferential direction, and the urging member is positioned at one side of the hook portion and placed outside in a disk radial direction from a center position of the hook portion.

13. The disk brake according to claim 5, wherein the torque transmitting portion of the backing plate is a convex hook portion each projecting from both sides of the backing plate in a disk circumferential direction, and the urging member is positioned at one side of the hook portion and placed outside in a disk radial direction from a center position of the hook portion.

14. The disk brake according to claim 1, wherein the torque transmitting portion of the backing plate is a convex hook portion each projecting from both sides of the backing plate in a disk circumferential direction, and the groove is disposed on the hook portion of the one lateral portion on a side facing the opposed surface portion of the mounting member.

15. The disk brake according to claim 1, wherein the urging member has a smaller spring constant than a spring constant k defined by Formula $k=4\ pi^2 \times f^2 \times m$, where f is an eigenfrequency defined upon the caliper vibrating as a rigid body in a condition that the caliper is mounted to the mounting member and m is a mass of the friction pad.

16. The disk brake according to claim 1, wherein the first face of the second extending portion has a first section and a second section, the first section disposed proximate to a free end of the second extending portion in relation to the second section, and the second section is disposed between the first section and the folded portion; and
wherein the first section of the first face keeps the contact with the mounting member and the second section of the first face keeps a clearance from mounting member in the condition where the second extending portion is accommodated in the groove.

17. The disk brake according to claim 16, wherein the first section of the first face maintains the contact with the mounting member and the second section of the first face maintains the clearance from the mounting member in the position in which the second extending portion abuts to the mounting member.

18. The disk brake according to claim 1, wherein the extending portion keeps a cantilevered state via the second extending portion being accommodated in the groove along with the first extending portion when the torque transmitting portion abuts to the mounting member upon the backward vehicle movement, and wherein the first face of the second extending portion maintains the contact with the mounting member and the second face of the second extending portion maintains the separation from the torque transmitting portion of the one lateral portion and the first extending portion in the cantilevered state.

19. The disk brake according to claim 5, wherein the urging member has a smaller spring constant than a spring constant k defined by Formula $k=4\ pi^2 \times f^2 \times m$, where f is an eigenfrequency defined upon the caliper vibrating as a rigid body in a condition that the caliper is mounted to the mounting member and m is a mass of the friction pad.

* * * * *